Oct. 20, 1959 G. W. COOK 2,909,759
SENSITIVE VERTICAL DISPLACEMENT SEISMOMETER
Filed June 15, 1953 5 Sheets-Sheet 1

INVENTOR.
GEORGE W. COOK
BY George Sipkin
B. L. Zangwill

Oct. 20, 1959 G. W. COOK 2,909,759
SENSITIVE VERTICAL DISPLACEMENT SEISMOMETER
Filed June 15, 1953 5 Sheets-Sheet 3

INVENTOR.
GEORGE W. COOK
BY George Sipkin
B. L. Tungwill

INVENTOR.
GEORGE W. COOK

Oct. 20, 1959    G. W. COOK    2,909,759
SENSITIVE VERTICAL DISPLACEMENT SEISMOMETER
Filed June 15, 1953    5 Sheets-Sheet 5

INVENTOR.
GEORGE W. COOK

United States Patent Office 2,909,759
Patented Oct. 20, 1959

2,909,759
SENSITIVE VERTICAL DISPLACEMENT SEISMOMETER

George W. Cook, Washington, D.C.

Application June 15, 1953, Serial No. 361,885

21 Claims. (Cl. 340—17)

(Granted under Title 35, U.S. Code (1952), sec. 266)

The present invention relates to instruments for measuring movement of large bodies, and more particularly to a device for measuring vertical motion of the earth's crust.

Instruments for measuring vertical movement of the earth's crust, or seismographs, have long been used, and are, in general, divided in two general classifications. The first of these classifications is directed to small portable instruments of limited accuracy used in subterranean survey work, and the second is directed to detection of movement of the earth due to natural causes, which second instruments are large, permanent installations where moderate accuracy is necessary.

The seismographs used in measuring earth movements due to natural causes have generally consisted of a large inertia element of large mass resiliently mounted on springs and connected to a recording mechanism cooperating with the supporting frame. As is true in all measurement of motion, the measuring system must have a very long natural period of oscillation in order to provide a reasonably accurate reference. If the natural period of oscillation is increased, the size and weight of the unit is correspondingly increased.

The present invention is directed to a movable unit for measuring vertical movement of the earth's crust which has a very long natural period of oscillation so as to permit accurate measurements. The unit comprises a small mass coupled with a long-time correction system and a short-time correction system which effectively control the natural period of oscillation, and a measuring system which greatly amplifies the indication of movements to provide high sensitivity and stability.

It is an object of the present invention to provide a seismographic unit having high sensitivity and stability.

It is a further object of the present invention to provide a seismographic unit having a very long natural period of oscillation.

It is a still further object of the present invention to provide a small, movable seismographic unit having a very long natural period of oscillation.

Other objects and advantages of the present invention, together with the many attendant advantages, will be made apparent to those skilled in the art by reference to the following description and to the appended drawings in which like or corresponding parts are indicated by the same reference character, and in which.

Figure 1:
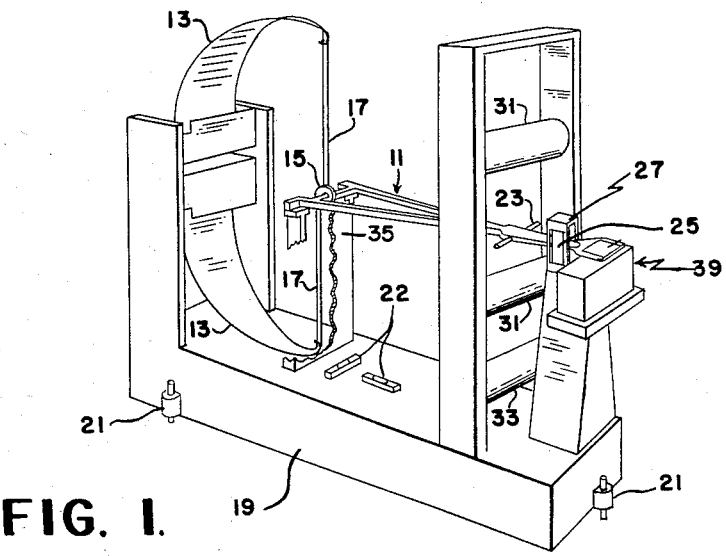
Fig. 1 is a perspective view of the mechanical seismograph of the present invention.

Referring now to the drawings, the mechanical section of the seismograph of the present invention comprises a pivoted seismograph arm 11 which is resiliently supported in a horizontal plane. While the invention is not limited thereto, the resilient support for the arm 11 may conveniently include one or more cantilever springs 13 which are attached to the arm by means of a linkage such as the torque wheel 15 about which is wound the torque tapes 17.

The springs 13 and the arm 11 are secured to the base 19 which is provided with leveling screws 21 and spirit levels 22 to facilitate installation. The outwardly extending end of the arm 11 carries a magnetic structure, such as the permanent magnet 23, the movable element 25 of a force generating system 27, and the movable element of a positional deviation detector 39. The permanent magnet 23 cooperates with electromagnets to provide a readily adjustable positioning force for the arm 11, the electromagnets employed in the preferred embodiment illustrated herein comprising the differential magnets 31 and the coarse adjustment magnet 33.

It will be apparent that the seismograph arm 11 serves the same function as the massive arm of conventional seismographs, but, in the present invention, may have a length of only twenty inches. In order to eliminate the friction of a conventional pivot the arm is secured to the pillar block 35 by means of flexures 36 of a resilient material, such as beryllium-copper. Since the natural period of oscillation of a mechanical structure is dependent upon the restoring force applied to that structure, the period of the arm 11 may be varied over wide limits by applying appropriate forces proportional to displacement thereto by means of the force generator 27, in addition to the restoring forces of the springs 13.

Figure 2:
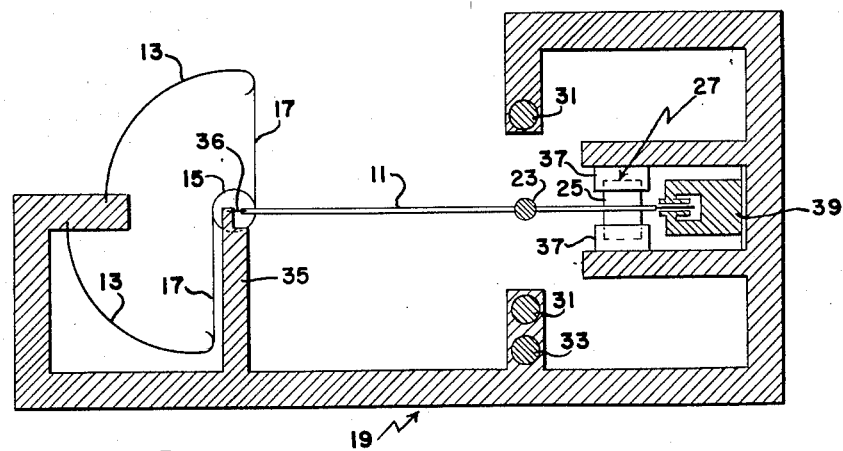
Fig. 2 is a schematic showing of the mechanical details of the present invention.

As best seen in Fig. 2, the weight of the arm 11 is largely supported by the springs 13, while coarse electromagnet 33 provides a force which acts as a vernier for the restoring force of the springs 13. The differential magnets 31 provide a force which acts as a vernier for the force of the coarse electromagnet 33. Deviations from the original horizontal position of the arm 11 are detected by means of the positional deviation detector 39 and recorded, and functions of the deviations are fed back to the arm in proper phase and magnitude to provide the desired oscillatory period for the arm 11 by means of the force generating system 27.

As described herein, the force generating system 27 comprises an electrostatic motor having opposed fixed plates 37 and the cooperating movable plates 25 attached to arm 11 intersticed therebetween. Since there is no mechanical interconnection, the force generating system adds no friction to the system.

The springs, base, arm, etc. are of course responsive to heat so that the balance point or neutral position of the arm 11 will vary slightly over extended periods of time and the forces produced by the electromagnets 31 and 33 on the permanent magnet 23 are adjusted to cause the arm to return to its neutral position if a displacement continues for more than a predetermined time interval, as hereinafter explained.

The force generating system 27 and the electromagnets 31 and 33 are controlled through sensitive servo-amplifiers, which may be of any desired types having high accuracy and sensitivity, the servo-amplifiers being responsive to the same position deviation indicating system which actuates the recorder, later to be described, and for convenience are of electronic types.

While any suitable type of position deviation indicator system may be employed, the preferred embodiment herein described embodies a carrier-current capacitive bridge circuit which has been found to possess excellent long-term stability and sensitivity. The recording system is per se not part of the invention, and is not described in detail. Because the positional deviation indication system is extremely sensitive and stable, the present seismograph is provided with measurement ranges extending from .05 micron through 50 microns with damping of 70.7% of critical damping on all ranges, and a natural period of oscillation of from 2 to 40 seconds.

Figure 3:
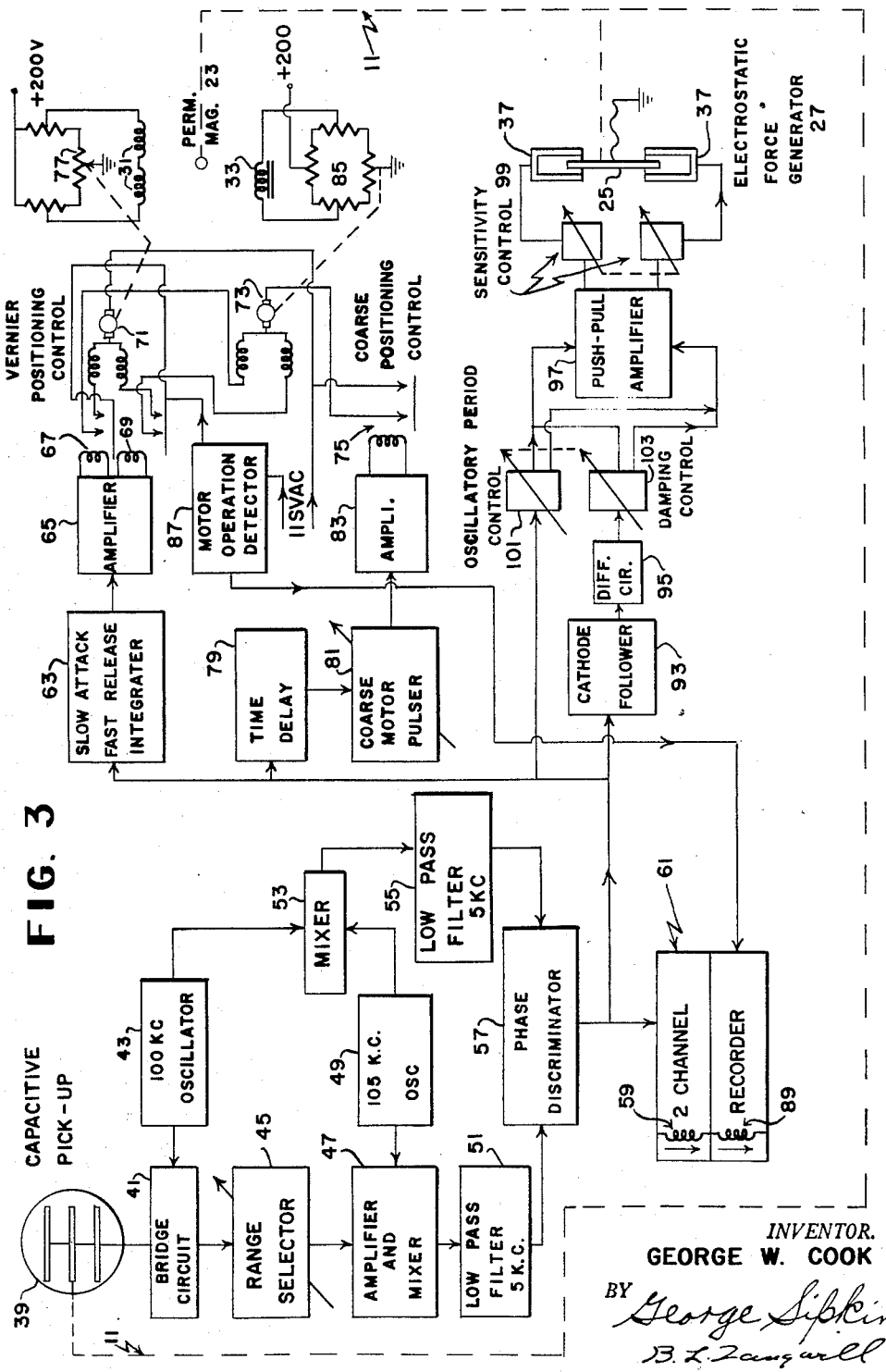
Fig. 3 is a block diagram of the servo- and recording systems of the present invention.

The electronic systems employed in the present invention are illustrated in block form in Fig. 3. The capacitive pickup 39 of the position deviation indicator system is differentially connected to a resonant bridge circuit 41 which is energized with a moderately high frequency, such as the output of oscillator 43 operating at 100 kc. The output signal of the bridge circuit 41 varies in magnitude and phase with the actuation of the capacitive pickup 39, and is impressed on the range selector 45 which comprises a voltage dividing network having a plurality of predetermined selectable ratios and is an attenuator circuit. The output voltage of the range selector 45 is then impressed on the amplifier and mixer 47 which also receives the output voltage of oscillator 49 which operates at a frequency near that of oscillator 43, such as 105 kc.

The lower frequency signal from the amplifier and mixer 47 is passed through the low-pass filter 51, and possesses the same relative magnitude and phase as that of the signal from the bridge circuit 41, but at a considerably lower frequency.

The output voltages of the oscillators 43 and 49 are combined in mixer 53 to produce a difference frequency which is separated by means of the low-pass filter 55 and used as a reference against which to compare the phase of the voltage appearing at the output of low-pass filter 51 in the phase discriminator 57. The output of the phase discriminator 57 is proportional in magnitude to the deviation from neutral of the capacitive pickup and in polarity with the sense of such deviation, which output is impressed on pen 59 of recorder 61.

The output of phase discriminator 57 is also impressed on a slow-attack fast-release integrator 63 which provides a signal proportional to long duration deviations of the arm 11 from neutral but which recovers in a very short time when such long duration deviations have been corrected.

The voltage appearing at the output of the integrator 63 is impressed on the amplifier 65 which controls two relays 67, 69, the relay 67 closing with signals of one polarity and the relay 69 closing with signals of the opposite polarity. Each of the relays is equipped with two normally open sets of contacts which are connected to respective terminals of the two reversible motors 71 and 73, the circuit of motor 71 being completed by the relays 67, 69 while the circuit of motor 73 includes the normally open contacts of relay 75, later to be described. It will be noted that the direction of operation of both motors is controlled by relays 67 and 69.

The armature of motor 71 is mechanically connected to the operating shaft of potentiometer 77 which has a travel of many turns to provide a vernier adjustment and which comprises a part of a bridge circuit supplying energizing power to the differential electromagnets 31.

For minor variations in the balance point of the arm 11, operation of the motor 71 is sufficient to correct it. However, should larger deviations occur, it is desirable to quickly correct them and to preserve the potentiometer 77 near the center of its range. If the operation of motor 71 has not corrected the deviations after a predetermined time interval, the coarse motor 73 is actuated, and in order to prevent overshooting, the coarse motor 73 is pulsed.

The voltage from the phase discriminator 57 is impressed on the time delay circuit 79 and thereafter on the coarse motor pulser 81 which is made adjustable in comparable steps with the steps of the range selector 45 to produce corresponding recovery rates in all ranges. The output of the coarse motor pulser 81 is impressed on the amplifier 83 to control the energization of relay 75 as previously mentioned.

The motor 73 is ganged to the coarse potentiometer 85 connected in a bridge circuit supplying power to electromagnet 33.

When either motor 71 or 73 operates, it is an indication that extraneous external forces are acting on the seismograph which will affect its accuracy, and it is therefore desirable to indicate such operation on the recorder 61. For this purpose, a motor operation detector circuit 87 is provided to record operation of one or both motors, which circuit is connected to pen 89 on recorder 61.

It will be apparent that the seismograph of the present invention has been corrected for long-time variations which will affect its operation, such as temperature, etc., by the circuit outlined above. However, the period of oscillation of the arm 11 would remain substantially unchanged were it not for the operation of the force generator 27.

Because it is desired to produce in the arm 11 a very long natural period of oscillation of many seconds, the several circuits of the system are made responsive to direct current signals and are directly connected to each other. The oscillatory period of arm 11 is controlled by the action of the forces tending to restore it to its original position after a deviation therefrom. Springs 13 exert a restoring torque upon arm 11. A servo-system is set up to either add to or oppose these restoring forces exerted by springs 13 in order to control the period of the system. The total system involved is a closed loop servo-system made up of arm 11 with its mount and springs 13, the capacitive pickup 39, the servo amplifiers and the force generator 27. The stiffness of this closed loop system will determine its natural period. Variation in the stiffness and hence the period may be controlled by control of the feedback of the servo-system.

As shown schematically in Fig. 3 the output of the phase discriminator 57, which as previously explained is proportional to the displacement of arm 11 is fed to the period control 101. The signal is split in element 101 into two relatively adjustable signals which in turn are fed to the two inputs to push-pull amplifier 97 feeding the force generator 27. One of these signal portions is adapted to produce a force aiding the restoring force of springs 13, i.e. a negative feedback or stiffness increasing effect. The remaining signal portion is adapted to produce a force on the arm 11 opposing the restoring action of springs 13, i.e. a positive feedback or stiffness decreasing effect. Since element 101 is effective to vary the relative amounts of positive and negative feedback present the overall period of the system including arm 11 may be changed at will.

As previously mentioned, the force generator 27 comprises opposed plates 37 which are secured to the frame 19 and the movable plate 25 secured to the arm 11, the movable plate being grounded. Differential variations in voltage are applied to the fixed plates 37 by means of the anode voltages of the push-pull amplifier 97.

It will be apparent that the force required to correct the response of the arm 11 will vary with the magnitude of the displacement and hence with the operating range of the instrument. The sensitivity of the force generator 27 must therefore be proportioned inversely with respect to the sensitivity of the deviation indicator, and the sensitivity control 99 is provided with steps inversely proportioned to the steps of range selector 45.

A plurality of voltage dividers corresponding to predetermined periods are arranged to be selectably inserted in the circuit by the oscillatory period control 101.

The damping of the system including arm 11 is also controllable. In the present system it is desired to produce a damping of 70.7% of critical at all oscillatory periods. The friction and windage of the arm are factors of the inherent damping of the system. These factors must be compensated for in order that the desired damping may be set in for each period set for the arm. Compensation is achieved by the use of velocity components of the displacement signal applied as positive and negative feedbacks to the force generator 27. Referring again to Fig. 3, the output signal from phase discriminator 57 is applied through cathode follower element 93 to a differentiating circuit shown at 95. The differentiating circuit 95 splits the signal into two relatively adjustable components which are in quadrature relation to the original displacement signal. The two derivative components are then fed to opposite sides of the push-pull input to amplifier 97. As in the case of the period control previously described, one of the derivative signal components has a negative feedback effect on the system while the other has a positive feedback effect. These components do not affect the period of the system but only the damping of the system. The compensation previously mentioned is secured by adjusting the relative magnitude of the positive and negative feedback signals until they are just sufficient to sustain the induced oscillation of the arm 11 at a uniform amplitude indefinitely.

The above compensation is adjusted for each period for which the seismograph system is to be set. From the known amounts of positive and negative feedback signal required for compensation at a given period, the amounts of positive and negative feedback signal necessary to secure the desired 70.7% of critical damping may be determined and set.

The damping selector element 103 and the period control element 101 are mechanically ganged, as will be hereinafter apparent, and selection of the desired period automatically sets in the proper damping correction for this period.

Assuming that the arm 11 is properly centered, it is resiliently biased to its normal position by the springs 13 and the forces produced on the permanent magnet 23 by the electromagnets 31 and 33, and will remain in that position until disturbed by a movement of the base 19, the bridge circuit 41 being in a balanced condition, and the forces produced by the force generator 27 being balanced. If and when the base 19 is moved, the arm 11 tends to remain stationary with respect to space, which unbalances the bridge circuit 41 and produces a displacement signal at the output of the phase discriminator 57.

The force generator 27 is actuated by the displacement signal to oppose or add to the mechanical restoring forces on the arm 11, but may be proportioned to be slightly smaller than the mechanical restoring forces so as to produce the effect of a very light spring having a very long resilient travel, so that the arm 11 may have effectively, a long natural period. At the same time, a signal which increases slowly in time is applied to the amplifier 65, the rate of increase depending upon the magnitude of the displacement and the time constant of the slow-attack fast-release integrator 63, and at a point determined by the sensitivity of the amplifier 65 and relays 67 and 69, the vernier positioning control motor 71 commences operation to correct such deviation. In the case of small changes which quickly correct themselves, the motor 71 does not operate.

It will be remembered that the displacement signal is also applied to the coarse positioning control amplifier 83, and if the deflection of the arm persists for a sufficient period of time to operate the time delay circuit 79, the coarse motor 73 is caused to operate in pulses of selectable length to aid in restoring the arm 11 to the neutral position.

Figure 4:
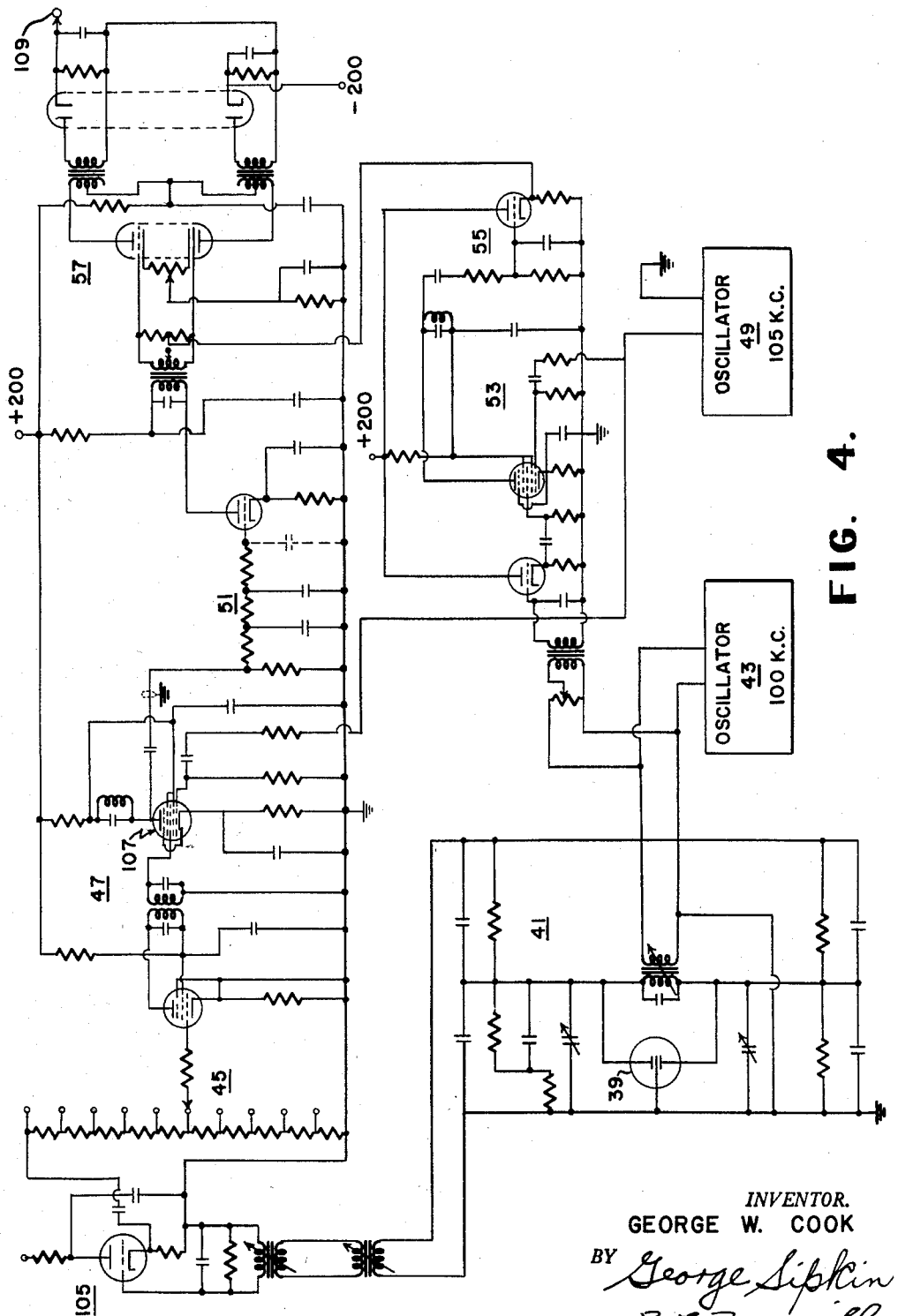
Figs. 4, 5, 5A and 6 together constitute a schematic diagram of the servo- and recording systems of the present invention.
Figure 5:
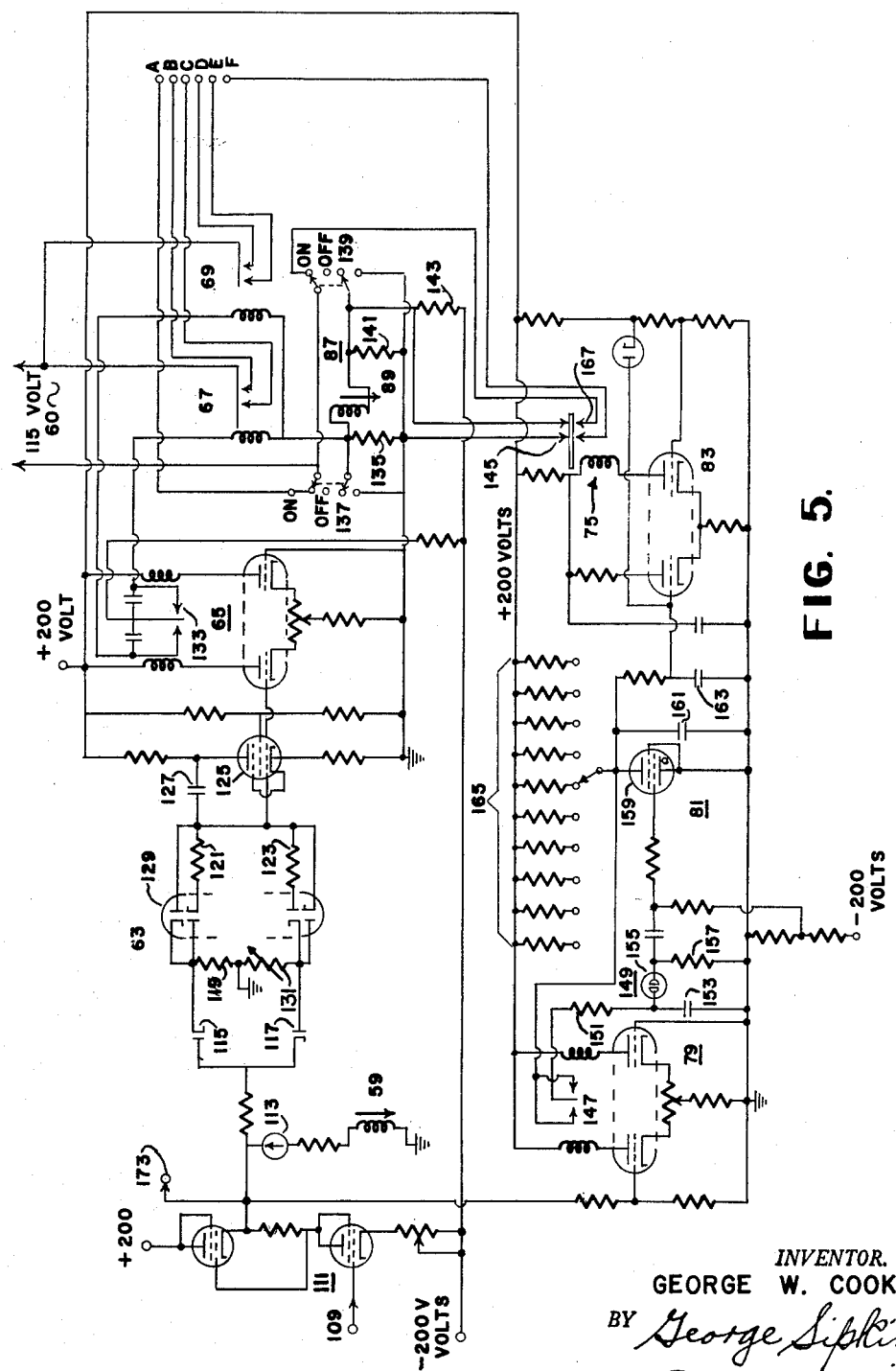
Figure 6:
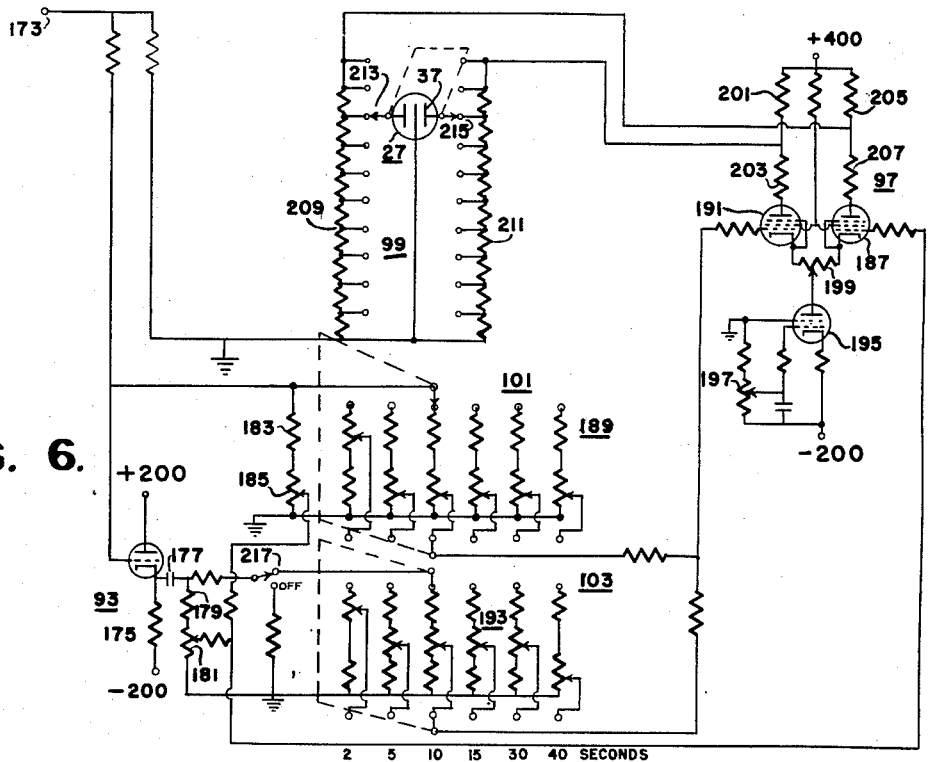
Figure 5A:
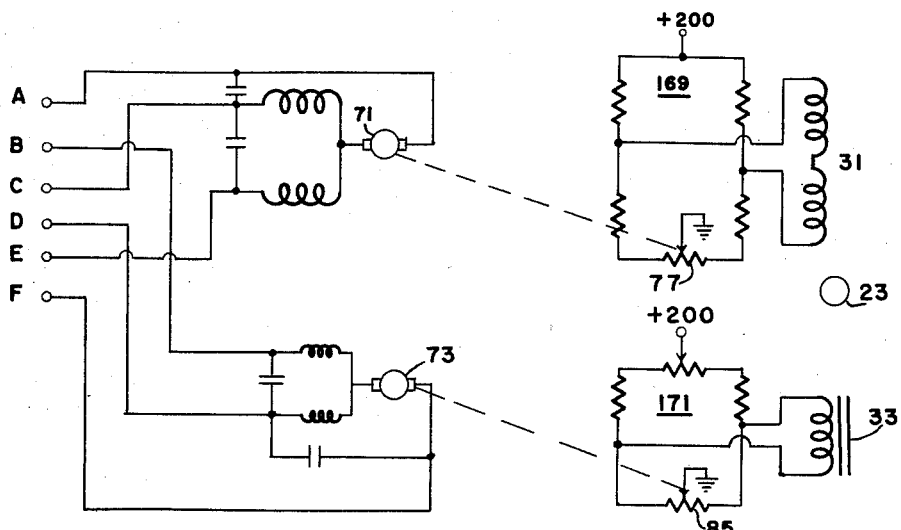

The details of the electronic system of the present invention are illustrated in Figs. 4, 5 and 6. Referring first to Fig. 4, the bridge circuit 41 comprises a capacitive bridge similar to that described in United States Patent No. 2,611,021, issued September 16, 1952 to George W. Cook and Thomas A. Perls for a Resonant Bridge Circuit except that a differential capacitive pickup is employed herein. As explained in the above patent, the bridge circuit 41 is made resonant at the frequency of the oscillator 43 with both the input and output transformers to provide a maximum sensitivity, and the output voltage from the bridge circuit 41 is passed through the isolation amplifier 105 which prevents interaction between the remainder of the circuit and connected as a cathode-follower.

The output voltage of the isolation amplifier 105 is impressed on the range selector 45 which includes a plurality of serially-connected resistors and a multi-position switch to select the desired proportion of the output voltage. The voltage appearing between the arm of the multi-position switch and ground is amplified and impressed on the mixer tube 107 in the amplifier and mixer 47.

The mixer tube 107 also receives the signal of oscillator 49 and its output contains the difference frequency which is separated by the low-pass filter 51 and impressed on the control grids of phase discriminator 57 as two voltages out of phase with each other.

A reference voltage for the phase discriminator is produced in the mixer 53 which also receives the signals of oscillators 43 and 49, suitable isolating amplifiers being included to prevent interaction between stages. A simple low-pass filter 55 is included in the circuit to separate the difference frequency which is impressed in phase on the cathodes of the phase discriminator 57 to produce output voltages which in the respective anodes of the discriminator vary with the phase and magnitude of the unbalance of the bridge circuit 41. The respective output voltages are coupled through transformers to individualized demodulator circuits which are connected in phase opposition to produce a polar output voltage at the terminal 109.

Referring to Fig. 5, the deviation signal appearing at terminal 109 is impressed on the control grid of the cascaded amplifier 111 which amplifies the deviation signal and produces an output voltage which is impressed on the recording pen 59 through the meter 113. The deviation signal which is impressed on the pen 59 is polar and varies about ground potential.

The voltage output of the cascaded amplifier 111 is impressed on the slow-attack fast-release integrator 63 which comprises diodes 115 and 117 which provide separate paths for positive and negative deviation signals. A positive signal will be passed through diode 115 to ground through resistor 119 to produce a voltage which also appears across resistors 121 and 123 in series and is impressed on the control grid of pentode 125. Variations in the conduction of pentode 125 are amplified and appear as much larger voltage changes at its anode and this large voltage changes capacitor 127, so that the effective capacitance of capacitor 127 is multiplied by the amplification of the tube. However, when the voltage across resistor 119 decreases, the capacitor 127 discharges through the reverse connected diode 129 which provides a low resistance discharge path. The circuit operates in a similar fashion in the opposite polarity through diode 117 and resistance 131 which is made adjustable to balance the operation of the circuit in the two directions.

The voltage appearing at the juncture of resistors 121 and 123 therefore is effectively paralleled by a large capacitance and changes very slowly. This voltage is impressed on the control grid of one tube of the cathode coupled amplifier 65 which is provided in its anode circuit with a relay having two balanced actuating coils in the respective anode circuits. When current through the actuating coils is substantially equal, the contacts of the relay 133 are open; however, an unbalance of the current therethrough on either direction will close the corresponding contacts.

The actuating coils of the relays 67 and 69 are connected to ground through resistor 135 and through the respective contacts of relay 133 to −200 volts. Thus, operation of the relay 133 actuates one or the other of relays 67 and 69 and produces a voltage across resistor 135. Each of the relays 67 and 69 is provided with normally open contacts which cooperate with a movable contact to connect both terminals thereto, and the respective normally open contacts are connected to the directional terminals of the vernier control motor 71 and the coarse control motor 73, corresponding terminals operating the respective motors in the same direction being connected to contacts on the same relay.

The switches 137 and 139 are provided to control the energization of the vernier control motor 71 and the coarse control motor 73 respectively, and are shown in the "on" position.

The motor operation detector 87 comprises the resistor 135 connected in series with the actuating coils of relays 67 and 69, the recording pen 89, the resistor 141 connected between the pen 89 and ground, resistor 143 connected between the pen 89 and −200 volts, and the normally closed contacts 145 of relay 75 shunting resistor 141. When neither relay 67 nor 69 is actuated, both ends of the recording pen 89 are at ground potential, but actuation of either relay applies the voltage produced across resistor 135 to the recording pen 89 to deflect its record. Should the relay 75 be actuated as hereinafter explained, a voltage will be applied to the opposite end of the recording pen 89 by the voltage appearing across resistor 141 to produce a different deflection thereof.

As previously stated, the coarse control motor 73 is operated only after a time interval which is provided by the time delay circuit 79 which comprises a cathode coupled paraphase amplifier having the differential actuating coils of relay 147 which relay is similar to relay 133 previously described. An unbalanced anode current in the paraphase amplifier, caused by a deflection voltage from the cascade amplifier 111, causes the contacts of relay 147 to close the circuit of the saw-tooth generator 149 comprising resistor 151, capacitor 153, neon tube 155 and resistor 157, so that capacitor 153 charges until the neon tube 155 ionizes to discharge it. The discharge of capacitor 153 through resistor 157 produces a positive pulse after a time delay determined by the constants of resistor 151 and capacitor 153.

The coarse motor pulsing circuit 81 comprises a thyratron tube 159 which is normally biased to cut-off paralleling capacitors 161 and 163 and connected through one of the selectable resistors 165 to +200 volts, the capacitors being normally charged. When the voltage appearing across 157 during the discharge of capacitor 153 is coupled to the thyratron tube 159, that tube is rendered conductive to discharge the capacitors, thus reducing the voltage on its anode until the capacitors discharge and again recharge. The recharge time of capacitors 161 and 163 is controlled by the constants of the resistor 165 in the circuit. The voltage applied to the saw-tooth generator 149 is also controlled by the anode of thyratron tube 159, so that the operation of the two circuits is synchronized.

The anode voltage of the thyratron tube 159 is connected to the control grid of cathode coupled amplifier 83 which has the actuating coil of relay 75 connected in the anode circuit of the phase-inverted tube, so that a decreased voltage at the anode of tube 159 causes actuation of the relay 75.

The relay 75 includes normally closed contacts 145 previously described and normally open contacts 167 which are connected in series with the common terminal A of the coarse position control motor 73. The coarse position control motor 73 thus operates in a direction controlled by the relays 67 and 69 when the relay 75 is also actuated.

The electromagnet 31 comprises two air cored coils which are serially connected and so poled as to produce differential fields on opposite sides of the permanent magnet 23. The coils are connected in a bridge circuit 169 which includes the helical potentiometer 77 having an operable range of 720 turns to provide accurate control of the current through the coils. The potentiometer is mechanically driven by the vernier position control motor 71.

The coarse electromagnet 33 comprises a single iron cored coil which is connected in the bridge circuit 171 which includes the coarse helical potentiometer 85 mechanically connected to the armature of coarse position control motor 73.

The force generating system 27 is shown in Fig. 6 and comprises the cathode-follower 93 which has its control grid connected to terminal 173 of Fig. 5 to receive a deflection signal therefrom, the signal appearing across the cathode resistor 175 being impressed on the differentiating circuit comprising capacitor 177, fixed resistor 179, and potentiometer 181. A portion of the signal from terminal 173 selectable by the voltage divider composed of resistor 183 and potentiometer 185 superimposed on the proportion of the differential signal from the movable arm of potentiometer 181 is impressed on the control grid of tube 187 in amplifier 97 for friction and windage compensation for the arm 11.

A portion of the signal from terminal 173 selectable by the voltage divider networks 189 in the oscillatory period selector 101 is impressed on the control grid of tube 191 in the amplifier 97, and in addition, a portion of the differentiated signal selectable by the voltage divider networks 193 in the damping control 103 is added in phase to the same grid. The oscillatory period control 101 and the damping control are ganged for simultaneous operation. The bias of amplifier 97 is settable by controlling the bias applied to variable resistance tube 195 by means of potentiometer 197, and the anode potentials may be balanced by potentiometer 199. The anode circuits of tubes 187 and 191 include voltage dividers comprising resistors 201, 203, 205, 207 and the junctures thereof are connected to the sensitivity control attenuators 99 which contain similar tapped resistances 209 and 211, the fixed plates 37 of force generator 27 being connected to the movable arms of the selection switches 213 and 215. The movable plate 25 being grounded.

The switch 217 is provided to disconnect the damping circuit 105 for adjustment of the force generator circuit 27. With the damping circuit 105 disconnected, the arm 11 is mechanically excited and the potentiometers 181 and 185 are adjusted until the arm 11 maintains an oscillation of constant amplitude. The several voltage dividers are then adjusted until that oscillation occurs at the desired frequency for each range. The individual damping circuits 193 are then adjusted to provide the desired rate of decay in the oscillation.

It will be readily apparent that the degree of damping of the arm 11 may be readily adjusted over wide ranges, and that the time constant of the arm may be readily varied over any range longer than the natural period of the arm.

While only a single modification of the present invention has been described in detail it will be readily apparent that many changes and modifications may be made in the device without departing from the spirit thereof, and it is desired to cover all such modifications as fall within the scope of the appended claims.

The invention described herein may be manufactured and used by or for the Government of the United States of America for governmental purposes without the payment of any royalties thereon or therefor.

What is claimed is:

1. In an instrument for measuring vertical deflections of the earth's crust, a base, means supporting said base on the earth's crust, an arm pivotally connected to said base, cantilever spring means for resiliently supporting said arm in a horizontal position, said cantilever spring means comprising a first and a second spring member, one end of said spring members being secured to said base in oppositely directed relation in a manner as to pull in opposite directions and the other end of said spring members being secured to said arm by a pair of connecting members, said connecting members being in substantially parallel relation and electric pickup means for measuring deflections of said arm with respect to said base.

2. In an instrument for measuring vertical deflections of the earth's crust, a base adapted to be supported on the earth's crust, an arm pivotally connected to said base, spring means for resiliently supporting said arm in a horizontal position, electrical pickup means connected to said arm and said base to indicate deflections of said arm with respect to said base, electrostatic force generating means connected to said arm and said base, and circuit means connecting said force generating means to said electrical pickup means, said circuit means including a slow attack-fast release integrator, whereby to control the oscillatory period of said arm.

3. In an instrument for measuring vertical deflections of the earth's crust, a base adapted to be supported on the earth's crust, an arm pivotally connected to said base, linear spring means for resiliently supporting said arm in a horizontal position, electrical pickup means secured to said base and said arm to produce an electrical signal proportional to the magnitude and sense of deflections of said arm with respect to said base, an integrating circuit connected to said electrical pickup means, said integrating circuit including an integrator having a long attack-short release time and means connected to said integrating circuit to maintain the mean position of said arm with said base substantially constant.

4. The device as claimed in claim 3 further characterized by a force generator mechanically connected to said base and said arm, and circuit means connecting said electrical pickup means to said force generator to control the oscillatory period of said arm.

5. In an instrument for measuring vertical deflections of the earth's crust, a base adapted to be supported on the earth's crust, an arm pivotally connected to said base, spring means resiliently supporting said arm in a horizontal position, electrical pickup means mechanically connected to said base and said arm, an integrating circuit including an integrator having a long attack-short release time connected to said electrical pickup to produce a signal proportional to the mean position of said arm relative to said base, magnetic means secured to said arm, electromagnetic means secured to said base, and electrical circuit means connecting said integrating circuit to said electromagnet means to maintain the mean position of said arm substantially constant.

6. The device claimed in claim 5 further characterized by a force generator mechanically connected to said base and said arm, and electrical circuit means including adjustable means for selectively varying the oscillatory period of said arm.

7. In an instrument for measuring vertical deflections of the earth's crust, a base adapted to be supported on the earth's crust, an arm pivotally connected to said base, spring means for resiliently supporting said arm in a horizontal position, electrical pickup means connected to said arm and said base and responsive to relative movement therebetween, electrostatic force generating means connected to said arm and said base, means for generating positive and negative feedback signals connected between said electrical pickup means and said force generating means, and means to adjust the relative amounts of positive and negative feedback signals applied to said force generating means to control the oscillatory period of the arm.

8. In an instrument for measuring vertical deflections of the earth's crust, a base adapted to be supported on the earth's crust, said base including an upstanding support and a pillar block spaced from said support, an arm pivotally mounted on said pillar block, and a linear suspension system for said arm including a first and a second flexed spring member, said spring members being secured at one of their ends to said support in oppositely directed relationship in a manner as to pull in opposite directions, and means connecting the other ends of said spring members to said arm for supporting said arm in a horizontal position.

9. In an apparatus as defined in claim 8 but further characterized by means for pivotally mounting said arm on the pillar block comprising a pair of thin flexure hinges, said flexure hinges being secured to said block and arm, respectively, with the datum plane of the hinge in the block and the datum plane of the hinge in the arm coinciding whenever the arm is in its horizontal position.

10. In an apparatus as defined in claim 9 but further characterized by said arm having a torque wheel secured thereto adjacent the pillar block, and said means connecting the arm and spring members comprising torque tapes secured in spaced relation on the wheel.

11. In a vertical deflection seismometer, a base member having an upstanding support and a pillar block spaced from said support, an arm having a rotor segment secured on one end, flexure means hingedly connecting said arm to said block, and a pair of oppositely directed cantilever springs secured on said support in a manner as to pull in opposite directions, said springs being flexed in the direction of said rotor segment with their unsecured ends being positioned on opposite sides of said rotor segment, and means connecting said unsecured ends of the spring members and said rotor segment, whereby said flexed springs are operative to exert a force through said rotor segment to support said arm in a horizontal position.

12. In an instrument for measuring vertical deflections of the earth's crust, a base member having an upstanding support and a pillar block spaced from said support, an arm hingedly connected to said pillar block, said arm having a torque wheel secured thereto adjacent said pillar block, and a resilient suspension system for supporting said arm in a horizontal position comprising, a pair of triangular-shaped spring members each of which have a base and an apex portion, said spring members being secured at their base portions to said support in longitudinally spaced and oppositely directed relationship to each other, each of said spring members being flexed to form a smooth arc and having their apex ends vertically aligned as tangents to segments of the torque wheel, and torque tapes mounted on said torque wheel and secured to the apex ends of said spring members.

13. In an apparatus as defined in claim 11 but further characterized by said hingedly connection for said arm comprising a pair of thin flexure hinges, said flexure hinges being securely fixed to said block and arm, respectively, with the datum plane of the hinge in the block and the datum plane of the hinge in the arm coinciding whenever the arm is in its horizontal position.

14. In a vertical displacement seismometer, a base member, an arm resiliently and horizontally supported on said base member, and means for correcting slow departures of the arm from a mean position relative to the base comprising, magnetic means mounted on said arm, pickup means mechanically and electrically connected to the base and arm for providing an electrical signal of a deviation by the arm from said mean position, a memory register integrator circuit connected to said pickup means, said integrator circuit having a slow attack fast release characteristic, electromagnetic means positioned on said base in force applying relationship with said magnetic means, and control means connecting said integrator circuit with said electromagnetic means for providing correcting forces to said magnetic means.

15. In an apparatus as defined in claim 14 but further characterized by said integrator circuit comprising a pair of reversely and parallel connected electronic tubes, an input means for said electronic tubes connected to said pickup means, and a charging circuit connected to said electronic tubes including a signal amplifying means and a capacitor.

16. In an apparatus as defined in claim 14 but further characterized by said memory register integrator circuit including a first and a second tube each of which has a plate element and a cathode element, the cathode element of the first tube and the plate element of the second tube being connected together, to said pickup means, and to ground potential through an impedance element, the cathode element of the second tube being connected through an impedance element to the plate element of the first tube, to ground potential through an impedance element and to the input of a signal amplifying means, and potential storing means connected between an output of the signal amplifying means and the plate element of said first tube.

17. A vertical displacement seismometer comprising, a base, an arm pivotally supported on said base and operative to move relative thereto, and means for controlling the oscillatory period of the arm including pickup means connected to said arm and base and responsive to relative movement therebetween for producing an electrical signal which is proportional to said relative movement, electrostatic force generating means, said force generating means having portions secured to said arm and said base respectively, circuit means connected between said pickup means and said electrostatic force generating means for applying feedback signals to said electrostatic force generating means to provide a restorative electrostatic force to said arm, said feedback signals being proportional to said electrical signal, and means for adjusting the relative amplitude of said feedback signals.

18. In an apparatus as defined in claim 17 but further including means for damping the oscillatory movement of the arm comprising a differentiating circuit connected to said pickup means for providing an output signal which is proportional to the velocity of arm motion, and means including adjustable means for feeding said output signal to said electrostatic force generating means.

19. In an apparatus as defined in claim 18 but further including means for controlling the damping of said arm in accordance with the inherent windage and friction of said arm, said last named means comprising adjustable means connected to said pickup means and said differentiating circuit on one side and connected to said electrostatic force generating means on the other side.

20. In a vertical displacement seismometer, a base, an arm pivotally mounted on said base for oscillatory movement relative to said base, a linear suspension system carried on said base and supporting said arm in a horizontal position, capacitative pickup means positioned on said base, said pickup means having portions attached to said arm and portions attached to said base, electrical circuit means connected to said capacitative pickup means for providing an electrical signal having a magnitude and polarity which is dependent upon the relative movement between said arm and base, and means for controlling the oscillatory movement of said arm comprising a plurality of meshed plate means carried on said arm and base, a first, second and third resistance network, a pair of amplifier means, a signal differentiating means connected to said electrical circuit means, said first resistance network being connected between said electrical circuit means and one of said pair of amplifier means, said second resistance network being connected between said differentiating means and the said one of said pair of amplifier means, said third network being connected to said first network means, said differentiating means and a second of said pair of amplifier means, and means including adjustable network means connecting said amplifier means to said meshed plate means.

21. In an apparatus as defined in claim 20 but further including magnetic means on said arm and cooperating electromagnetic means on the base to provide adjustable positioning force for the arm, and motor control means interposed between said electric circuit means and the magnetic means on said base for controlling the energization of said magnetic means on said base, said last named means including an averaging circuit for the electrical signal to provide a controlled signal for said magnetic means on the base.

References Cited in the file of this patent

UNITED STATES PATENTS

| | | |
|---|---|---|
| 2,302,219 | Hostetler | Nov. 17, 1942 |
| 2,482,233 | Arringdale | Sept. 20, 1949 |
| 2,497,965 | Usselman | Feb. 21, 1950 |
| 2,559,173 | Shawhan | July 3, 1951 |
| 2,562,983 | Clewell | Aug. 7, 1951 |
| 2,576,775 | Case | Nov. 27, 1951 |
| 2,600,967 | Chernosky | June 17, 1952 |
| 2,636,160 | Loper et al. | Apr. 21, 1953 |
| 2,657,374 | Bardeen | Oct. 27, 1953 |
| 2,659,065 | Cordell | Nov. 10, 1953 |
| 2,739,297 | Atanasoff | Mar. 20, 1956 |